US008417032B2

(12) United States Patent
Mizuno et al.

(10) Patent No.: US 8,417,032 B2
(45) Date of Patent: Apr. 9, 2013

(54) ADJUSTMENT OF IMAGE LUMINANCE VALUES USING COMBINED HISTOGRAM

(75) Inventors: Ryosuke Mizuno, Shinagawa-ku (JP); Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/696,062

(22) Filed: Apr. 3, 2007

(65) Prior Publication Data

US 2007/0286480 A1 Dec. 13, 2007

(30) Foreign Application Priority Data

Apr. 20, 2006 (JP) ................................ 2006-117187

(51) Int. Cl.
*G06K 9/00* (2006.01)

(52) U.S. Cl.
USPC ........... 382/168; 382/169; 382/254; 382/274; 382/275

(58) Field of Classification Search .................. 382/168, 382/169, 254, 274, 275
See application file for complete search history.

(56) References Cited

U.S. PATENT DOCUMENTS 5,450,502 A * 9/1995 Eschbach et al. ............. 382/169
5,581,370 A * 12/1996 Fuss et al. ...................... 358/447
5,724,456 A * 3/1998 Boyack et al. ................ 382/274
5,751,844 A * 5/1998 Bolin et al. ................... 382/156
5,862,254 A * 1/1999 Kim et al. ..................... 382/168
5,963,665 A * 10/1999 Kim et al. ..................... 382/169
6,266,441 B1 * 7/2001 Hashimoto et al. ........... 382/170
6,438,165 B2 * 8/2002 Normile ........................ 375/240
6,463,173 B1 * 10/2002 Tretter .......................... 382/168
6,665,450 B1 * 12/2003 Cornog et al. ................ 382/276
6,807,298 B1 * 10/2004 Park et al. ..................... 382/165
6,865,295 B2 * 3/2005 Trajkovic ...................... 382/170
6,950,114 B2 * 9/2005 Honda et al. .................. 345/626
6,985,623 B2 * 1/2006 Prakash et al. ................ 382/173
7,003,153 B1 * 2/2006 Kerofsky ...................... 382/168
7,012,625 B1 * 3/2006 Kobayashi et al. ........... 345/690
7,058,220 B2 * 6/2006 Obrador ........................ 382/168
7,158,674 B2 * 1/2007 Suh ............................... 382/170
7,245,764 B2 * 7/2007 Nishizawa .................... 382/168
7,310,589 B2 * 12/2007 Li ................................. 702/179
7,474,846 B2 * 1/2009 Subbotin ....................... 396/102
7,676,111 B2 * 3/2010 Yamauchi ..................... 382/275
7,738,698 B2 * 6/2010 Altunbasak et al. .......... 382/169
7,760,961 B2 * 7/2010 Moldvai ........................ 382/274
8,254,677 B2 * 8/2012 Abe et al. ...................... 382/170
2002/0102021 A1 * 8/2002 Pass et al. ..................... 382/170
2002/0136454 A1 * 9/2002 Park et al. ..................... 382/168
2003/0081856 A1 * 5/2003 Sartor et al. .................. 382/274
(Continued)

FOREIGN PATENT DOCUMENTS

JP 10-187949 A 7/1998
JP 2001-125535 A 5/2001
JP 2002-281312 A 9/2002

*Primary Examiner* — Claire X Wang
*Assistant Examiner* — Gandhi Thirugnanam
(74) *Attorney, Agent, or Firm* — Carter, DeLuca, Farrell & Schmidt LLP

(57) ABSTRACT

A first conversion characteristic is calculated from image information of a first image region including target pixel of an input image, a second conversion characteristic is calculated from image information of a second image region including the first image region, and a third conversion characteristic is calculated using the first and second conversion characteristics and a weighted coefficient. Then, a luminance value of the target pixel is converted and outputted based on the third conversion characteristic.

17 Claims, 22 Drawing Sheets

U.S. PATENT DOCUMENTS

2004/0170316 A1* 9/2004 Saquib et al. ................. 382/162
2004/0213478 A1* 10/2004 Chesnokov ................... 382/260
2005/0031201 A1* 2/2005 Goh .............................. 382/169
2005/0088534 A1* 4/2005 Shen et al. ................. 348/218.1
2006/0182360 A1* 8/2006 Lee et al. ...................... 382/254
2006/0192693 A1* 8/2006 Yamauchi ....................... 341/50
2007/0001997 A1* 1/2007 Kim et al. ..................... 345/102
2007/0053587 A1* 3/2007 Ali ................................ 382/168
2007/0183682 A1* 8/2007 Weiss ............................ 382/261
2007/0269132 A1* 11/2007 Duan et al. .................... 382/274
2007/0286480 A1* 12/2007 Mizuno et al. ................ 382/168
2007/0297689 A1* 12/2007 Neal ............................. 382/274
2010/0157078 A1* 6/2010 Atanassov et al. ......... 348/222.1

* cited by examiner

--PRIOR ART--

--PRIOR ART--

FIG. 6

| | | | | | | | | |
|---|---|---|---|---|---|---|---|---|
| Level No. | 1 | 2 | 3 | 4 | 5 | 6 | 7 | 8 |
| INPUT LUMINANCE VALUE (0 TO 255) | 0-15 | 16-31 | 32-47 | 48-63 | 64-79 | 80-95 | 96-111 | 112-127 |
| Level No. | 9 | 10 | 11 | 12 | 13 | 14 | 15 | 16 |
| INPUT LUMINANCE VALUE (0 TO 255) | 128-143 | 144-159 | 160-175 | 176-191 | 192-207 | 208-223 | 224-239 | 240-255 |

FIG. 8

| Level No. | 1 | 2 | 3 | 4 | 5 | 6 | 7 | 8 |
|---|---|---|---|---|---|---|---|---|
| INPUT LUMINANCE VALUE (0 TO 255) | 0-31 | 32-63 | 64-95 | 96-127 | 128-159 | 160-191 | 192-223 | 224-255 |

ADJUSTMENT OF IMAGE LUMINANCE VALUES USING COMBINED HISTOGRAM

BACKGROUND OF THE INVENTION

1. Field of the Invention

The present invention relates to image processing apparatuses and methods in which luminance values of input images are converted for output.

2. Description of the Related Art

In recent years, large screen flat display devices such as plasma displays, liquid crystal displays, rear projection displays, and the like have become widespread.

Generally, since limitations occur in the range of luminance levels for reproducible images (dynamic range) in these display devices due to characteristics of individual display devices, it is common for processing to be carried out for outputting of images in which contrast is emphasized within the limited dynamic range.

Histogram flattening is known as a typical processing technique. Specific description is given of basic processing techniques in histogram flattening using the following diagrams.

FIG. 1 is a diagram for describing basic processing techniques in histogram flattening. In FIG. 1, the horizontal axis indicates an input luminance level and the vertical axis indicates a number of pixels. Here, $x_{min}$ indicates a smallest input luminance level and $x_{max}$ indicates a largest input luminance level.

Furthermore, H(x) shown on the vertical axis is a luminance histogram indicating a number of pixels appearing of the input luminance level x. And C(x) shown as a dotted line is a cumulative luminance histogram up to the input luminance level x. It should be noted that a relationship between the luminance histogram and the cumulative luminance histogram can be expressed by formula (1).

$$C(x) = \sum_{i=0}^{x} H(i) \tag{1}$$

Here, a smallest output luminance level is given as $x'_{min}$ and a largest output luminance level is given as $x'_{max}$. And the vertical axis of the cumulative luminance histogram C (x) is normalized to $C(X_{min})=x'_{min}$ and $C(x_{max})=x'_{max}$. FIG. 2 shows a function C'(x) in which the cumulative luminance histogram is normalized. C'(x) shall be called a histogram flattening function.

When a luminance level numeral is given as L, a relationship between C(x) and C'(x) is shown by formula (2).

$$C'(x) = (C(x) - C(x_{\min}))\frac{L-1}{C(L-1) - C(x_{\min})} \tag{2}$$

Histogram flattening refers to a process by which input luminance levels are converted using the histogram flattening function C'(x) that is calculated as shown above, and after this processing it is possible to obtain an output image in which the frequency distribution of luminance levels have become uniform.

Generally since each luminance level is used uniformly in histogram flattening, conversion can be achieved to images having rich tone expression in which contrast is emphasized as a whole. On the other hand, excessive contrast is emphasized when there is a large disparity in the frequency distribution of the input luminance levels, which may result in the output of an unnatural image.

For this reason, in picture quality correction circuits, such as that disclosed in Japanese Patent Application Laid-Open No. 2001-125535 for example, picture quality deterioration due to excessive emphasis of contrast is suppressed by carrying out a picture quality correction process in which a limit is set on the number of appearances for the respective input luminance levels and distribution of extreme characteristic points is suppressed.

However, with conventional histogram flattening, the histogram flattening has been carried out based on a histogram of the image of the entire screen, and therefore there has been a problem of tone expression deteriorating in some areas. For example, when the histogram of an entire screen favors bright areas, partial regions having a low luminance level within the screen end up being converted to a very low luminance level, thus resulting in a problem that partial darkish regions become all black.

Also, conversely, when the histogram of an entire screen favors dark areas, partial regions having a high luminance level within the screen end up being converted to a very high luminance level, thus resulting in a problem that partially bright regions become all white.

SUMMARY OF THE INVENTION

An embodiment of the present invention is provided to enable adjustment of an image's luminance values so as to reduce clipped shadows and clipped highlights that occurs in some areas when contrast has been emphasized within a limited dynamic range.

According to one aspect of the present invention, there is provided an image processing apparatus in which luminance values of an input image are converted for output, comprising: a first image information extracting unit configured to extract first image information from a first image region including a target pixel; a first conversion characteristics calculating unit configured to calculate a first conversion characteristic from the first image information; a second image information extracting unit configured to extract second image information from a second image region including the first image region; a second conversion characteristics calculating unit configured to calculate a second conversion characteristic from the second image information; a weighted coefficient calculating unit configured to calculate a weighted coefficient; and a third conversion characteristics calculating unit configured to calculate a third conversion characteristic for converting a luminance value of the target pixel, using the first conversion characteristic, the second conversion characteristic, and the weighted coefficient, wherein the luminance value of the target pixel is converted and outputted based on the third conversion characteristic.

According to another aspect of the present invention, there is provided a method in which luminance values of an input image are converted for output, comprising: extracting first image information from a first image region including a target pixel; calculating a first conversion characteristic from the first image information; extracting second image information from a second image region including the first image region; calculating a second conversion characteristic from the second image information; and calculating a third conversion characteristic for converting a luminance value of the target pixel, using the first conversion characteristic, the second conversion characteristic, and a weighted coefficient, wherein the luminance value of the target pixel are converted and outputted based on the third conversion characteristic.

Further features of the present invention will become apparent from the following description of exemplary embodiments with reference to the attached drawings.

BRIEF DESCRIPTION OF THE DRAWINGS

FIG. 6 shows a corresponding relationship between the input luminance values and the luminance levels of the luminance histogram shown in FIG. 5.

FIG. 8 shows a corresponding relationship between the input luminance values and the luminance levels of the luminance histogram shown in FIG. 7.

DESCRIPTION OF THE EMBODIMENTS

Hereinafter, detailed description of preferred embodiments for executing the present invention is given with reference to the accompanying drawings.

[First Embodiment]

Figure 1:
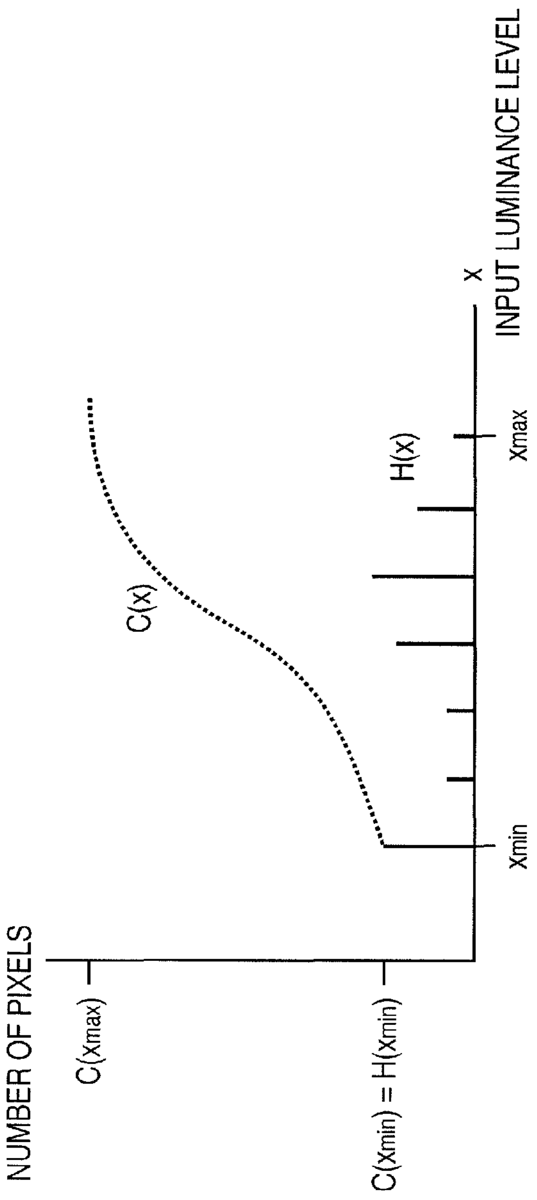
FIG. 1 is a diagram for describing basic processing techniques in histogram flattening.
Figure 2:
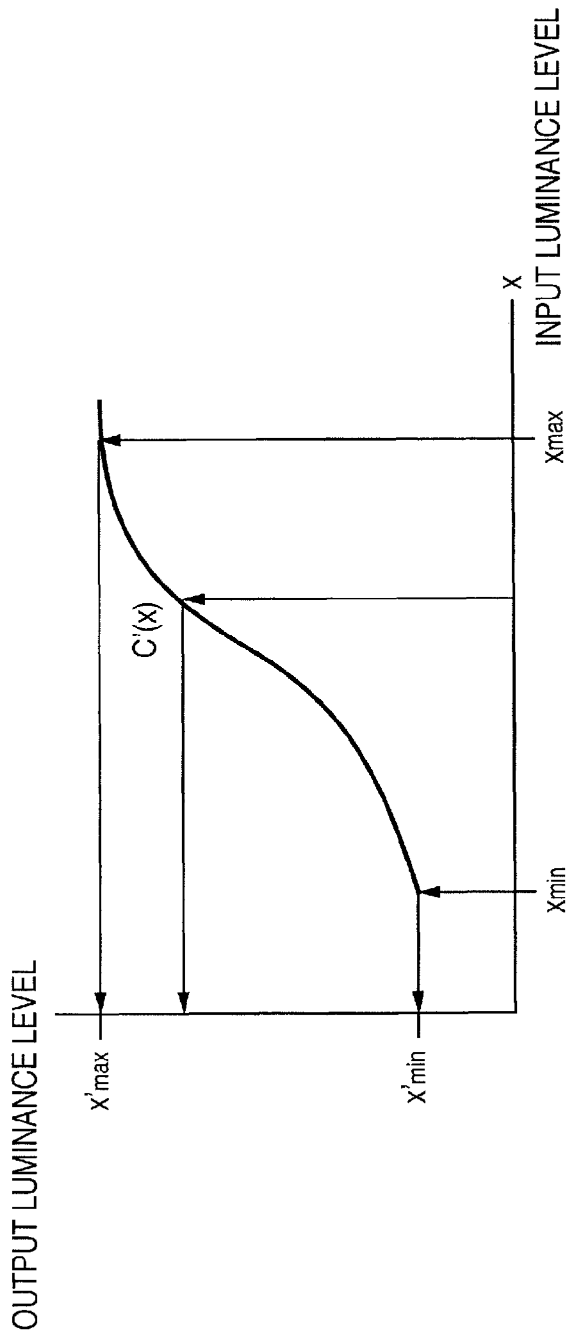
FIG. 2 shows a function C'(x) in which the cumulative luminance histogram is normalized.
Figure 3:
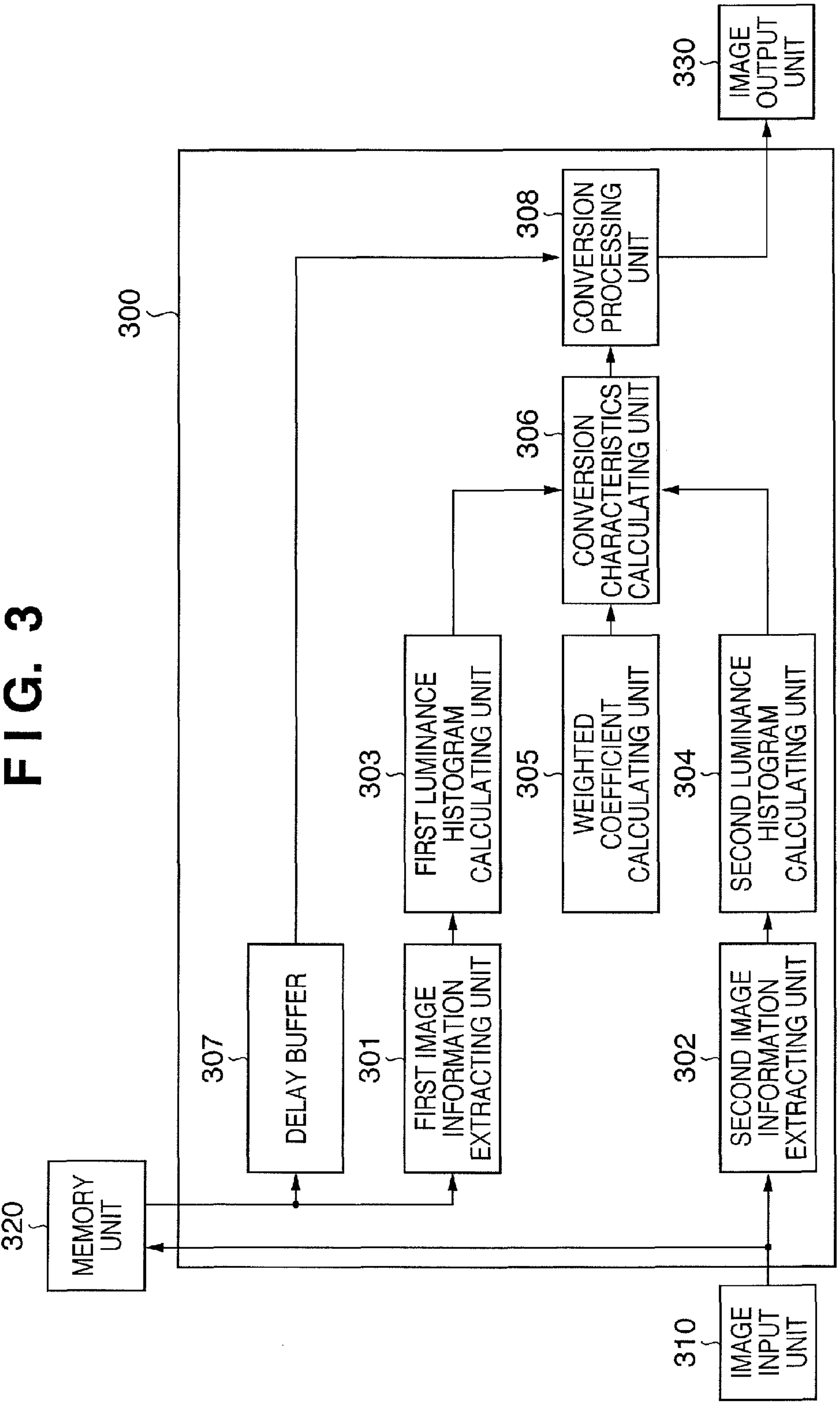
FIG. 3 shows one example of a configuration of a display device according to a first embodiment.

FIG. 3 shows one example of a configuration of a display device according to a first embodiment. In FIG. 3, numeral 300 indicates a luminance value adjusting unit, numeral 310 indicates an image input unit, numeral 320 indicates a memory unit, and numeral 330 indicates an image output unit. First, the image input unit 310 corresponds to a decoder that receives image data such as video signals and outputs in a desired format. For example, this includes a decoder that receives DVI (digital visual interface) standard signals or MPEG format compressed signals and decodes these into 24-bit RGB values, which is 8 bits each for RGB.

Next, the memory unit 320 corresponds to a frame memory, which is for receiving signals that are outputted from the image input unit 310 and outputting with a delay of at least one frame. For example, this includes an SDRAM (synchronous dynamic random access memory) and an interface for a memory controller thereof. The signals that are outputted from the image input unit 310 are inputted to the memory unit 320 and also inputted to the luminance value adjusting unit 300.

Next, the image output unit 330 converts the output video signals, which have undergone luminance adjustment in the luminance value adjusting unit 300, into signals suitable for an image display device and outputs these. Image display devices include for example plasma displays, liquid crystal displays, rear projection displays, and the like.

Here, description is given of a detailed configuration of the luminance value adjusting unit 300 and a luminance value adjusting process in which luminance values of signals inputted from the image input unit 310 are adjusted.

Figure 4:
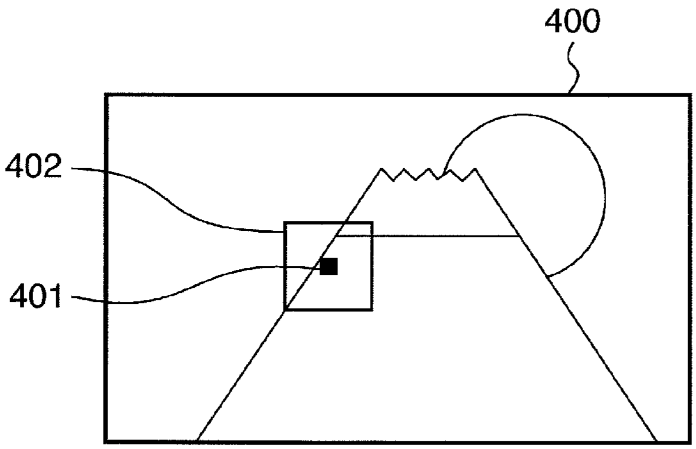
FIG. 4 is a diagram for describing a luminance value adjusting process in a luminance value adjusting unit 300.

FIG. 4 is a diagram for describing a luminance value adjusting process in the luminance value adjusting unit 300. In FIG. 4, numeral 401 indicates a reference point (a dot blotted out in black on the screen), numeral 402 indicates a region of a fixed size centering on the reference point 401, and numeral 400 represents a region of an entire screen.

In the first embodiment, when a target pixel is in the position of the reference point 401, the region 402 of a fixed size centering on the reference point 401 is designated as a first image region and the region 400 of the entire screen is designated as a second image region. Then, a luminance histogram (called a first luminance histogram) is obtained from the first image region and a luminance histogram (called a second luminance histogram) is obtained from the second image region. Further still, a conversion function is calculated based on a luminance histogram (called a third luminance histogram) in which the first and second luminance histograms are combined, and a luminance value of the target pixel is adjusted according to the calculated conversion function.

It should be noted that "a target pixel" is the reference point based on which the first image region is set and also is a pixel to be focused on whose the luminance value is to be adjusted. Furthermore, by handling all the pixels in the input signals in succession as the target pixel, luminance value adjustments are carried out for the entire screen.

In the luminance value adjusting unit 300 shown in FIG. 3, numeral 302 indicates a second image information extracting unit, which receives video signals from the image input unit 310 and extracts video signals of the second image region, then converts these to luminance values. Numeral 304 indicates a second luminance histogram calculation unit, which receives luminance values from the second image information extracting unit 302 and calculates a luminance histogram (a second luminance histogram) of the second image region for each frame. After calculation, the second luminance histogram of each frame is stored in a conversion characteristics calculating unit, which is described later.

Numeral 301 indicates a first image information extracting unit, which receives video signals from the memory unit 320 and determines a position of the target pixel, then extracts video signals of the first image region based on position information of the target pixel and converts these to luminance values. Numeral 303 indicates a first luminance histogram calculation unit, which receives luminance values from the first image information extracting unit 301 and calculates a luminance histogram (the first luminance histogram) of the first image region for each time the position of the target pixel changes. After calculation, the first luminance histogram of each time the position of the target pixel changed is stored in the conversion characteristics calculating unit, which is described later.

As described above, in the first embodiment, the region 402 of a fixed size centering on the target pixel is set as the first image region and therefore the position of the first image region changes each time the position of the target pixel changes. For this reason, it is necessary to calculate the first luminance histogram each time the position of the target pixel changes.

On the other hand, the second image region is the region 400 of the entire screen and therefore the second image region is constant regardless of the position of the target pixel. That is, the second luminance histogram may be calculated for each frame (each time the display screen switches).

Furthermore, by providing the memory unit 320, the first image information extracting unit 301 and the second image information extracting unit 302 can process the same video signals at different timings. Consequently, the second luminance histogram, which requires a large processing capacity until the luminance histogram is calculated since the surface area of the region is large, can be calculated in advance and stored in the conversion characteristics calculating unit, which is to be described later. On the other hand, the first luminance histogram, which requires little processing capacity since the surface area of the region is small, can be calculated and stored successively using the video signals from the memory unit 320.

When obtaining luminance values from the input image signals, the first image information extracting unit 301 and the second image information extracting unit 302 operate based on formula (3) for example. Note that the input video signals (RGB values) are set to Rin, Gin, and Bin, and the luminance values are set to Yin.

$$Yin=0.299\,Rin+0.587\,Gin+0.114\,Bin \quad (3)$$

Here, description is given concerning a luminance histogram calculating technique in the first luminance histogram calculation unit 303 and the second luminance histogram calculation unit 304.

First, the luminance histogram can be obtained by using a counter to count the number of pixels appearing in the input luminance values for each set of input luminance values. Here, specific description is given using FIG. 5 to FIG. 8 concerning a technique for calculating luminance histograms in the first embodiment.

Figure 5:
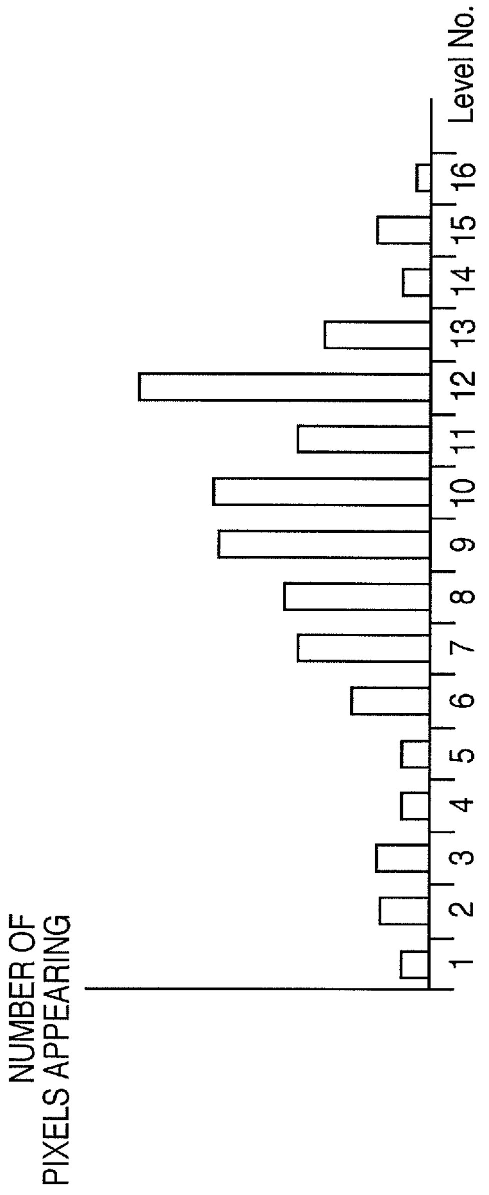
FIG. 5 shows a specific example of a luminance histogram when the number of luminance levels is divided into 16 when there is a dynamic range of input luminance values of 8 bits (256 values).

FIG. 5 shows a specific example of a luminance histogram when the number of luminance levels is divided into 16 when there is a dynamic range of input luminance values of 8 bits (256 values). Furthermore, FIG. 6 shows a corresponding relationship between the input luminance values and the luminance levels of the luminance histogram shown in FIG. 5. As shown in FIG. 5 and FIG. 6, first a counter is prepared for each luminance level, then a determination is made as to which luminance level the input luminance level corresponds based on the corresponding relationship shown in FIG. 6, thus enabling luminance histogram to be obtained by counting the number of pixels appearing for each luminance level.

Figure 7:
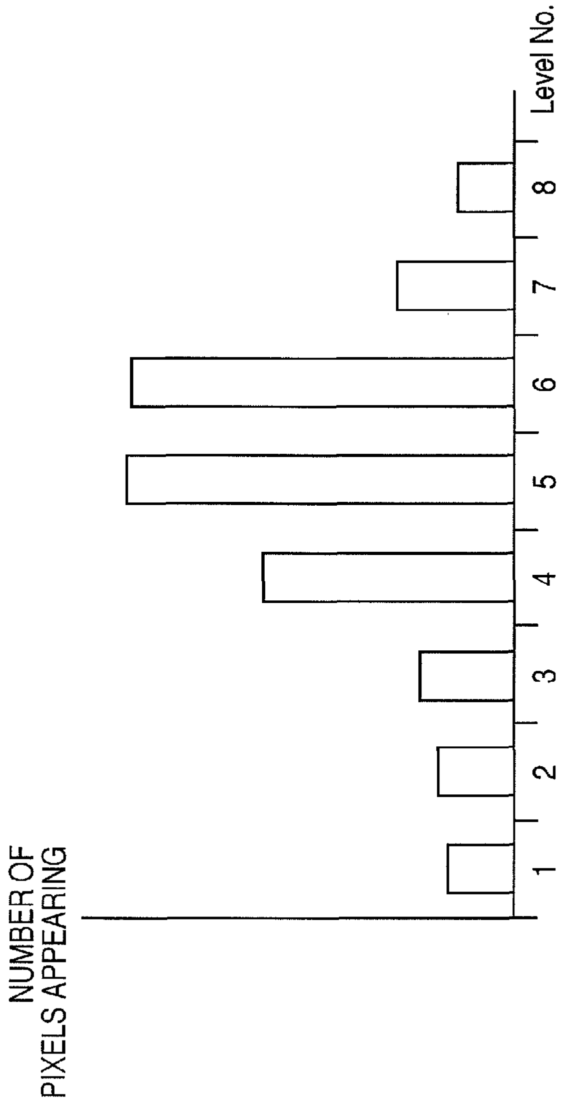
FIG. 7 shows a specific example of a luminance histogram when the number of luminance levels is divided into 8.

It should be noted that the above-mentioned number of luminance levels is not limited to 16 and may be any number. For example, FIG. 7 shows a specific example of a luminance histogram when the number of luminance levels is divided into 8. Furthermore, FIG. 8 shows a corresponding relationship between the input luminance values and the luminance levels of the luminance histogram shown in FIG. 7.

Returning to FIG. 3, numeral 306 indicates a conversion characteristics calculating unit, which carries out a combining process and a limiting process from a weighted coefficient, which is to be described later, of the first luminance histogram and the second luminance histogram, and calculates a conversion function. Here, using FIG. 9 to FIG. 12, description is given of the combining process and the limiting process respectively by the conversion characteristics calculating unit 306 using specific examples.

Figure 9:
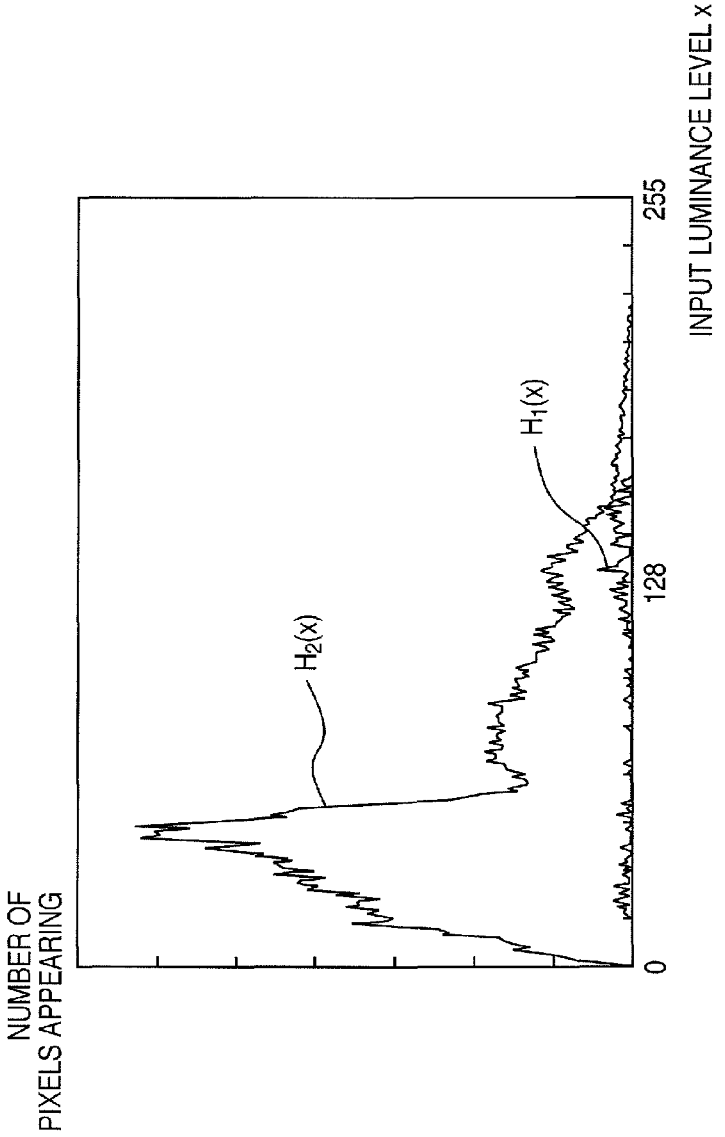
FIG. 9 shows a specific example of a luminance histogram combining process according to the first embodiment.
Figure 10:
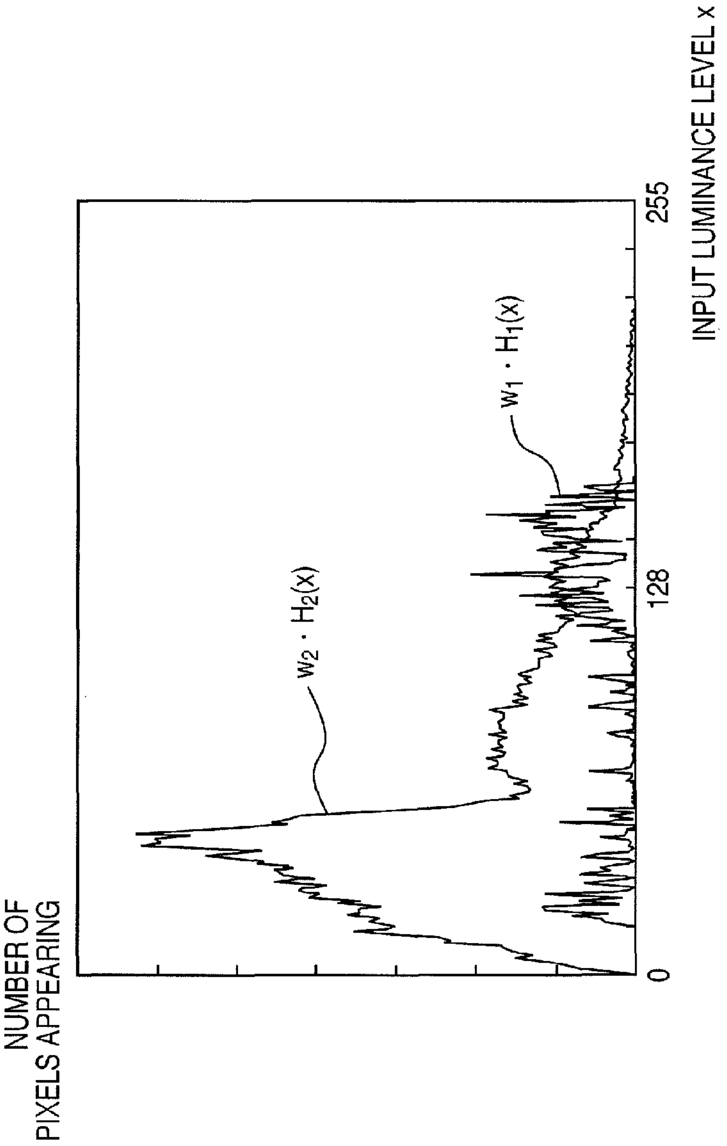
FIG. 10 shows a specific example of a luminance histogram combining process according to the first embodiment.
Figure 11:
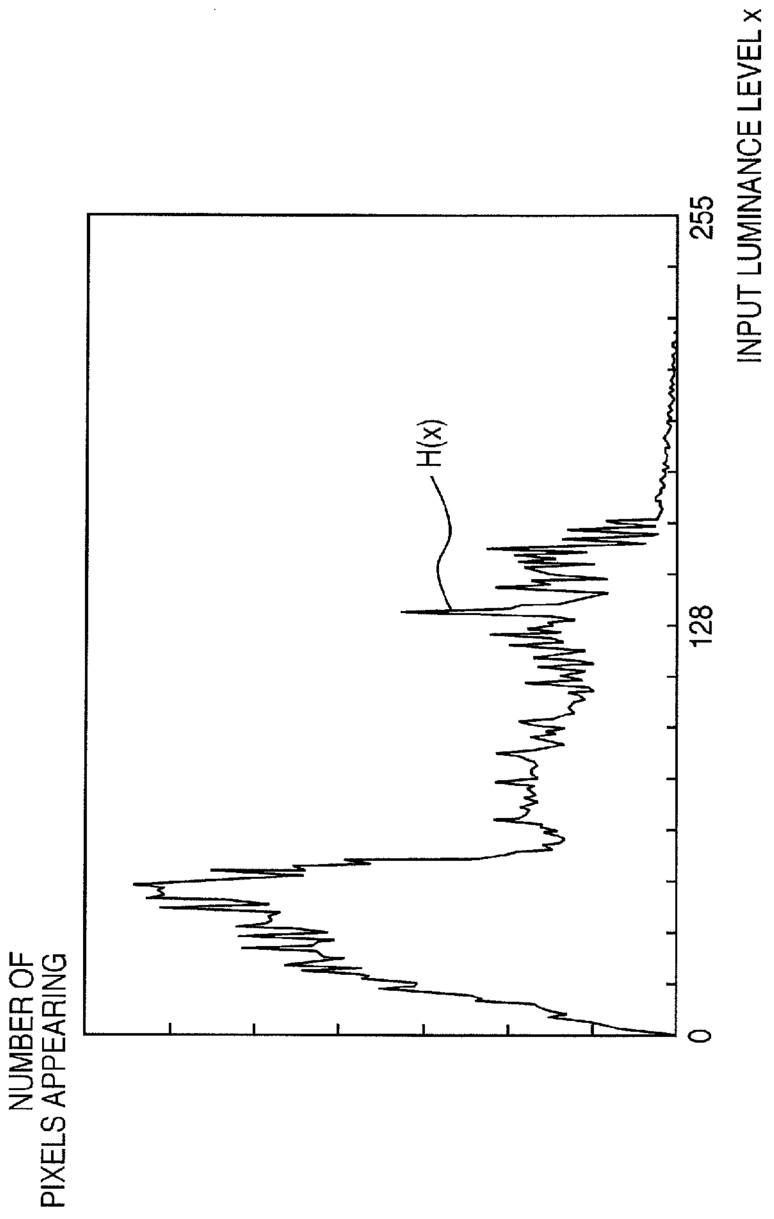
FIG. 11 shows a specific example of a luminance histogram combining process according to the first embodiment.

FIGS. 9 to 11 show examples of a luminance histogram combining process according to the first embodiment. In these diagrams, a horizontal axis x indicates an input luminance level and the vertical axis indicates a number of appearing pixels.

In FIG. 9, $H_1(x)$ indicates the first luminance histogram, which was obtained by the first luminance histogram calculating unit 303 from the region 402 of a fixed size centering on the reference point 401 (the first image region) shown in FIG. 4 for example. Similarly, $H_2(x)$ indicates the second luminance histogram, which was obtained by the second luminance histogram calculating unit 304 from the region 400 of the entire screen (the second image region) shown in FIG. 4.

In the combining process, a third luminance histogram H(x) is obtained by adding the first luminance histogram $H_1(x)$ and the second luminance histogram $H_2(x)$ based on formula (4) for each luminance level. Here, $w_1$ and $w_2$ are weighted coefficients.

$$H(x)=w_1\cdot H_1(x)+w_2\cdot H_2(x) \quad (4)$$

When adding luminance histograms without using weighted coefficients, the second luminance histogram has a higher proportion than the first luminance histogram with respect to the third luminance histogram. This is because, compared to the first luminance histogram, the second luminance histogram is calculated from luminance values of a region having a large image region size (large number of pixels). Accordingly, in the first embodiment, a weighted coefficient calculating unit 305 sets weighted coefficients depending on each region size (number of pixels) of the first image region and the second image region.

For example, when a Full HD (1,920×1,080 pixels) display device is used, the first image region size is set to 16×16 pixels and the second image region size is set to 1,920×1,080 pixels. In this case, it is preferable to set $w_1$=1,024 and $w_2$=1, approximately, as the weighted coefficients. Also, in consideration of the circuit scale, these may be set as $w_1$=1 and $w_2$=1/1,024.

FIG. 10 shows the first luminance histogram and the second luminance histogram after the weighted coefficients have been added. This is an example of when the proportion of the first luminance histogram has been made larger. FIG. 11 shows the third luminance histogram after the first luminance histogram and the second luminance histogram have been added. The third luminance histogram is converted to a histogram flattening function C'(x) based on the aforementioned formulas (1) and (2).

As mentioned earlier, the histogram flattening function obtained here is calculated based on a luminance histogram including both luminance information of the entire screen and luminance information of areas around the target pixel.

For this reason, compared to when converting a luminance value of the target pixel using a conventional histogram flattening function obtained from only luminance information of the entire screen, the probability is higher of being able to convert the luminance levels of regions in the vicinity of target pixel to broader luminance levels. That is, the conventional problems of darkish regions becoming all black and light regions becoming all white are reduced.

On the other hand, when the histogram flattening function is used as it is to carry out adjustment of luminance values, excessive luminance extension can be applied due to conversion characteristics of the histogram flattening function, and unnatural images may be outputted. For this reason, the conversion characteristics calculating unit 306 carries out a limiting process on the conversion intensity of the histogram flattening function to suppress excessive luminance extension.

Next, description is given using a specific example concerning a limiting process of the histogram flattening function in the conversion characteristics calculating unit 306.

Figure 12:
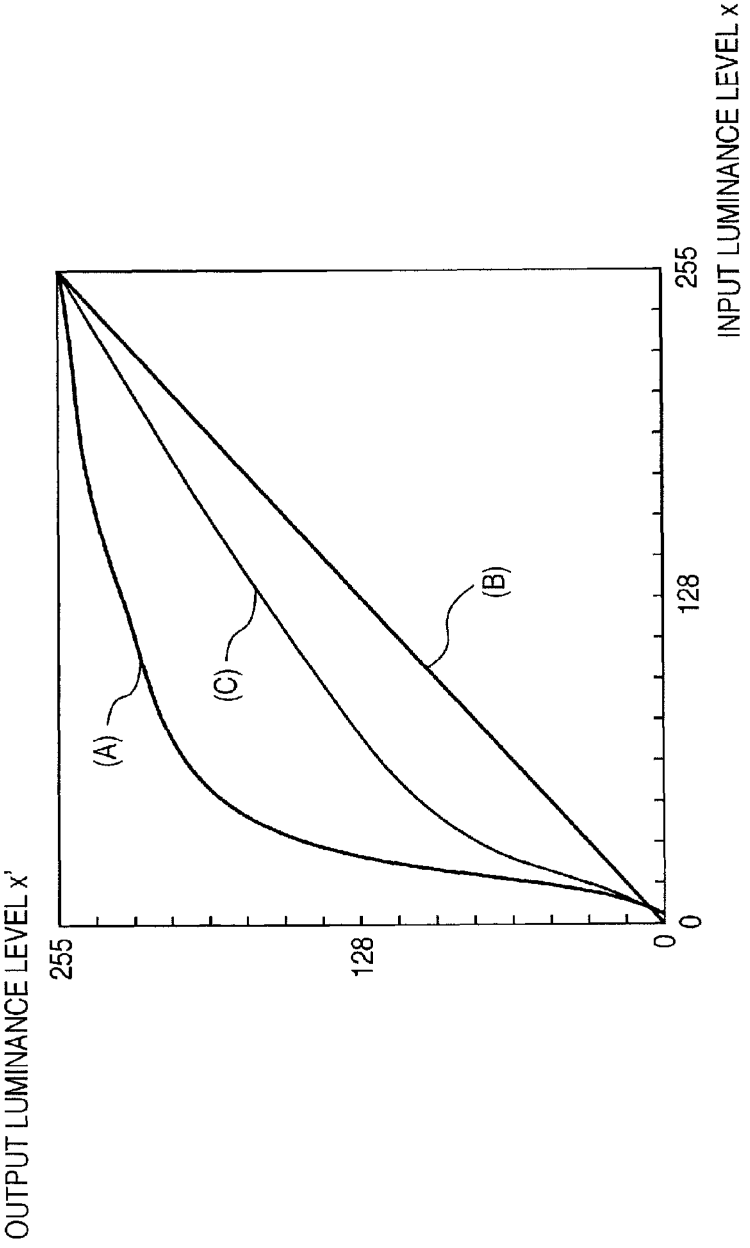
FIG. 12 shows a specific example of a limiting process according to the first embodiment.

FIG. 12 shows a specific example of a limiting process according to the first embodiment. In this diagram, the horizontal axis x indicates the input luminance level and a vertical axis x' indicates an output luminance level. In FIG. 12, (A) indicates the aforementioned histogram flattening function. Furthermore, (B) indicates conversion characteristics when there is no conversion, where values of the input luminance level and the output luminance level are equivalent (x=x'). Here, the conversion characteristics when there is no conversion is referred to as a no-conversion function.

In order to suppress excessive luminance extension, the conversion characteristics of the histogram flattering function may be close to those when there is no conversion. Accordingly, in the limiting process of the conversion characteristics calculating unit 306, processing is carried out so that while the conversion characteristics of the histogram flattening function are maintained as much as possible, they are kept close to a constant proportion to the conversion characteristics when there is no conversion. Specifically, as shown in formula (5), a difference value between the histogram flattening function and the no-conversion function is obtained and 40% of the difference value is added to the no-conversion function. In this way, the conversion function shown by (C) in FIG. 12 is calculated. Here, F(x) is the conversion function.

$$F(x)=x+0.4(C'(x)-x) \tag{5}$$

It should be noted that the coefficient 0.4 in the second section on the right in formula (5) refers to 40% of the difference value (C'(x)−x).

Here, returning to FIG. 3, numeral 308 indicates a conversion processing unit, which uses a conversion function calculated by the conversion characteristics calculating unit 306 to convert the luminance value of the target pixel, which is outputted from a delay buffer indicated by numeral 307. After the target pixel is read out from the memory unit 320 to the first image information extracting unit 301, the delay buffer 307 delays outputting the value of the target pixel by a time required until the conversion function is calculated.

The converted luminance value is inversely converted to RGB values based on formula (6) for example and outputted to the image output unit 330. Here, the input video signals (RGB values) of the target pixel are set to Rin, Gin, and Bin, and the input luminance value is set to Yin. Furthermore, the output luminance value after conversion of the target pixel is set to Yout and the output video signals (RGB values) are set to Rout, Gout, and Bout.

$$Rout=Rin+Yout-Yin$$

$$Gout=Gin+Yout-Yin$$

$$Bout=Bin+Yout-Yin \tag{6}$$

It should be noted that the formula used in inversely converting to RGB values is not limited to the above-mentioned formula (6). For example, an inverse conversion formula may be used after the luminance values Y and color components Cb and Cr are separated based on formula (7) in the first image information extracting unit 301 and the second image information extracting unit 302.

$$Yin=0.299\,Rin+0.587\,Gin+0.114\,Bin$$

$$Cb=-0.169\,Rin-0.331\,Gin+0.500\,Bin$$

$$Cr=0.500\,Rin-0.419\,Gin-0.081\,Bin \tag{7}$$

Figure 13:
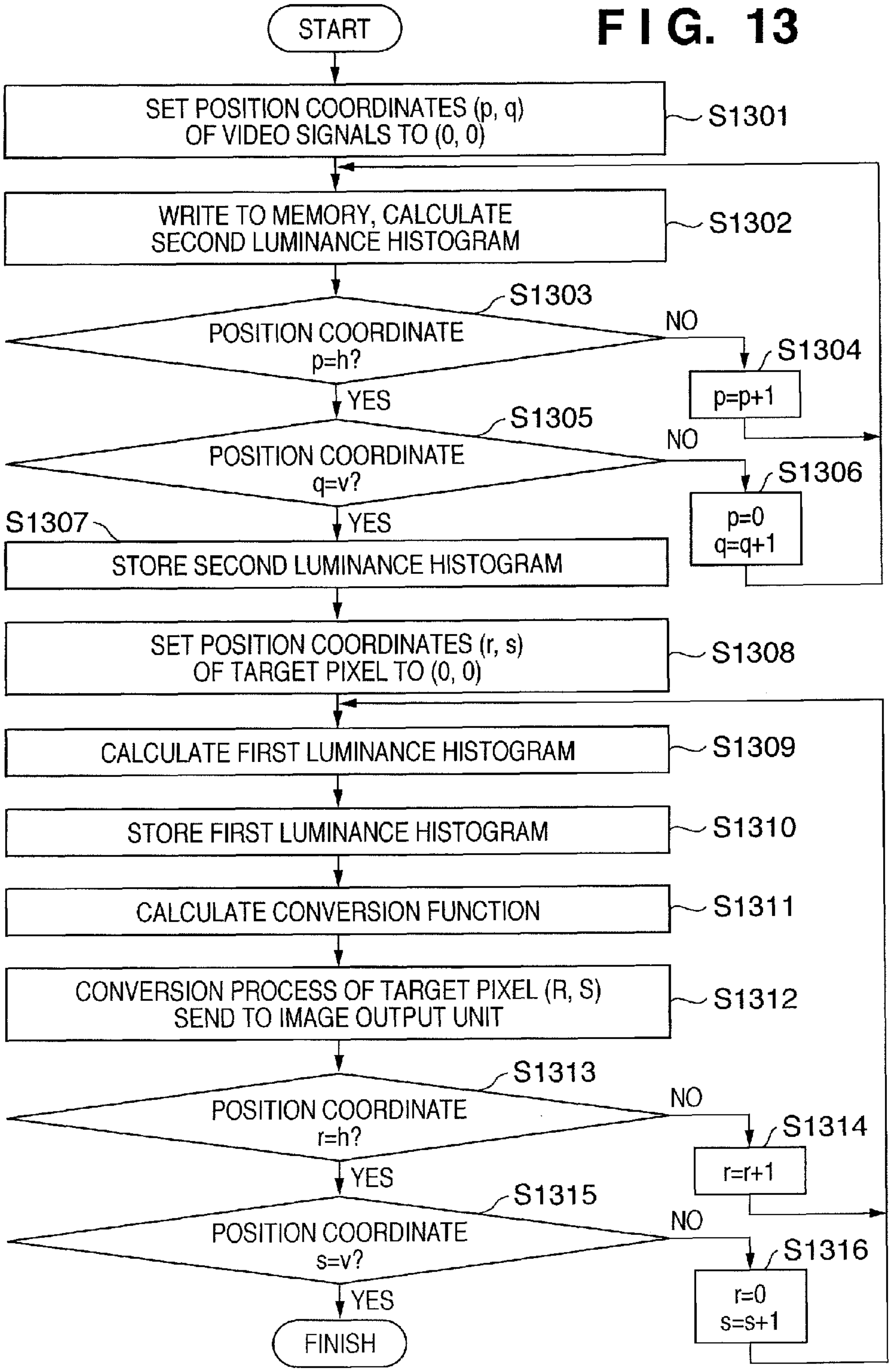
FIG. 13 is a flowchart showing a process of the luminance value adjusting unit 300 according to the first embodiment.

Next, description is given using FIG. 13 of a process in which luminance value of the target pixel is adjusted in the luminance value adjusting unit 300.

FIG. 13 is a flowchart showing a process of the luminance value adjusting unit 300 according to the first embodiment. In this example, when the image size of the input image is set to width h+1 pixels, height V+1 pixels, the position coordinates at the upper left of the input image are established as (0, 0) and the position coordinates of the lower right are established as (h, V). Further still, the position coordinates of video signals outputted from the image input unit 310 are expressed as (p, q) and the position coordinates of the target pixel are expressed as (r, s)

First, at step S1301, the position coordinates (p, q) of a video signal outputted from the image input unit 310 are set to (0, 0) and the procedure proceeds to step S1302. At step S1302, the video signal outputted from the image input unit 310 is written to the memory unit 320 and the video signal is converted to luminance value and undergo calculation of the second luminance histogram. This process is carried out by the second image information extracting unit 302 and the second luminance histogram calculation unit 304.

At step S1303 to S1306, a determination is carried out as to whether or not the calculation process at step S1302 has been completed for all of the video signals for a single screen. Here, if the processing of step S1302 has been completed for all video signals (YES at step S1305), the procedure proceeds to step S1307. And if the processing of step S1302 has not been completed for all video signals (NO at step S1305), the position coordinates (p, q) of the video signals are updated at step S1306 and the process returns to step S1302.

Here, specific description is given concerning the updating of (p, q). First, at step S1303, a determination is carried out as to whether or not the position coordinates of the video signal are at a right edge of the input image (that is, p=h), and if not at the right edge (NO at step S1303), then the process proceeds to step S1304 in which the position coordinates of the video signal are moved adjacently right (that is, p=p+1). Furthermore, at step S1303, if the position coordinates of the video signal are at the right edge of the image (that is, p=h), then the procedure proceeds to the next step, step S1305. At step S1305, a determination is carried out as to whether or not the position coordinates of the video signal are at a final line of the image (that is, q=v), and if not at the final line of the image, then the process proceeds to step S1306 in which the position coordinates of the video signal are moved to the left edge one line downward (that is, p=0, q=q+1). Furthermore, if the position coordinates of the video signal at step S1305 are at the final line, then the procedure proceeds to the next step, step S1307 and the second luminance histogram that has been calculated is stored in the conversion characteristics calculating unit 306.

With the above-mentioned process, the video signals for a single screen are written to the memory unit 320, and the calculation of the second luminance histogram, which is a luminance histogram of the entire screen, and the storage thereof to the conversion characteristics calculating unit 306 are completed.

Next, at step S1308, the video signal outputted from the memory unit 320 is received and position coordinates (r, s) of the target pixel are set to (0, 0). Next, at step S1309, the first luminance histogram is calculated based on the position coordinates (r, s) of the target pixel. This process is carried out by the first image information extracting unit 301 and the first luminance histogram calculation unit 303. Next, at step S1310, the first luminance histogram that has been calculated is stored in the conversion characteristics calculating unit 306.

Next, at step S1311, a conversion function for converting the luminance value of the target pixel is calculated using the second luminance histogram stored at step S1307, the first luminance histogram stored at step S1310, and the weighted coefficients. Then, at step S1312, the luminance value of the target pixel at the position coordinates (r, s) is converted using the conversion function calculated at step S1311 and new luminance value is obtained. This process is carried out by the conversion characteristics calculating unit 306, the conversion processing unit 308, and the weighted coefficient calculating unit 305. Then the obtained luminance values are finally inversely converted to RGB values and outputted to the image output unit 330.

Next, at step S1313 to S1316, a determination is carried out as to whether or not the processes of step S1309 to step S1312 have been completed for all of the video signals for a single screen, and if they have been completed, then processing in the luminance value adjusting unit 300 is completed. And if this has not been completed, then the position coordinates (r, s) of the target pixel are updated.

The above was one specific example of a flowchart showing a process of the luminance value adjusting unit 300. According to an embodiment, a processing flow for a single screen is shown and described with reference to FIG. 13, but the above-described processing flow can be carried out in parallel for video signals that are continuously inputted for two or more screens.

With the first embodiment, the histogram flattening function is calculated based on a luminance histogram including both luminance information of the entire screen and luminance information of areas around the target pixel. This increases the probability that the luminance levels of regions in the vicinity of target pixel will be converted to broader luminance levels and makes it possible to reduce problems of darkish regions becoming all black and light regions becoming all white.

Furthermore, with the first embodiment, excessive luminance extension can be suppressed and the probability of unnatural images being outputted is reduced.

Further still, with the first embodiment, the memory unit 320 is provided and the same video signals are inputted at different timings into the first image information extracting unit 301 and the second image information extracting unit 302. In this way, the second luminance histogram, which requires a large processing capacity until the luminance histogram is calculated since the surface area of the region is large, is calculated in advance and stored in the conversion characteristics calculating unit 306. On the other hand, the first luminance histogram, which requires little processing capacity since the surface area of the region is small, can be calculated and stored successively using the video signals that are outputted from the memory unit 320. This makes it possible to shorten the processing time required until calculation of the conversion function.

[Second Embodiment]

Next, detailed description is given concerning a second embodiment of the present invention with reference to the accompanying drawings. In the first embodiment, a combination of the first luminance histogram and the second luminance histogram was carried out. In the second embodiment, a first conversion function and a second conversion function are obtained from the first luminance histogram and the second luminance histogram respectively, and these two conversion functions are combined.

Figure 14:
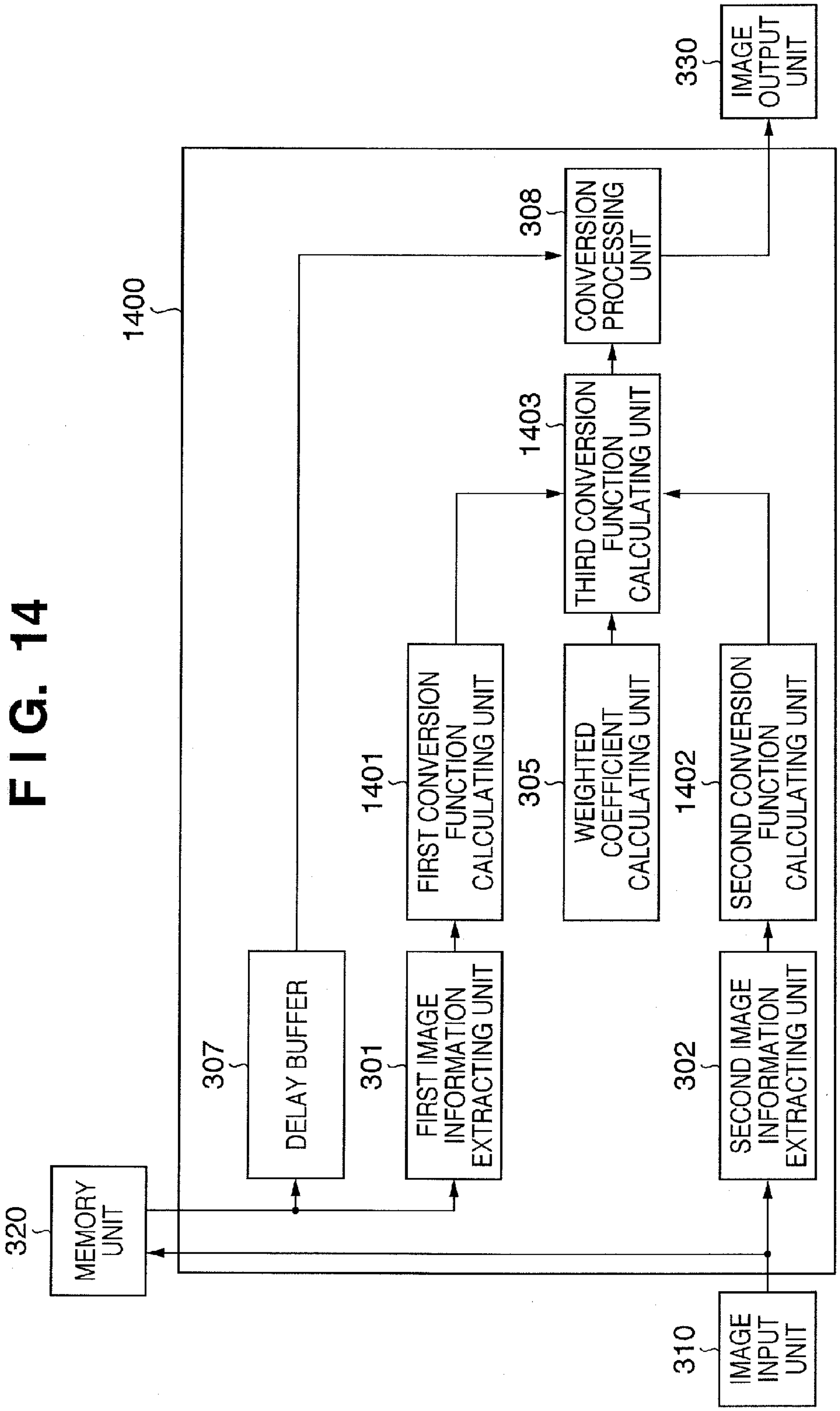
FIG. 14 shows one example of a configuration of a display device according to a second embodiment.

FIG. 14 shows one example of a configuration of a display device according to the second embodiment. Components having a same function as in the first embodiment shown in FIG. 3 are given same symbols and description thereof is omitted. In FIG. 14, numeral 1401 indicates a first conversion function calculating unit, numeral 1402 indicates a second conversion function calculating unit, and numeral 1403 indicates a third conversion function calculating unit.

After calculating the first luminance histogram, the first conversion function calculating unit 1401 obtains a first cumulative luminance histogram $C_1(x)$ based on formula (8). Further still, a histogram flattening function $C'_1(x)$ is obtained based on formula (9). Then, after calculating the second luminance histogram, the second conversion function calculating unit 1402 similarly obtains a second cumulative luminance histogram $C_2(x)$ based on formula (8). Further still, a histogram flattening function $C'_2(x)$ is obtained based on formula (9).

$$C_1(x)=\sum_{i=0}^{x} H_1(i),\ C_2(x)=\sum_{i=0}^{x} H_2(i) \tag{8}$$

$$C_1'(x)=(C_1(x)-C_1(x_{min}))\frac{L-1}{C_1(L-1)-C_1(x_{min})},$$

$$C_2'(x)=(C_2(x)-C_2(x_{min}))\frac{L-1}{C_2(L-1)-C_2(x_{min})} \tag{9}$$

Next, with the third conversion function calculating unit 1403, a process of combining the histogram flattening functions $C'_1(x)$ and $C'_2(x)$ is performed giving consideration to the weighted coefficients $w_1$ and $w_2$. Specifically, this is based on formula (10).

$$C'_{1+2}(x)=w_1\cdot C'_1(x)+w_2\cdot C'_2(x)(w_1+w_2=1) \tag{10}$$

Figure 15:
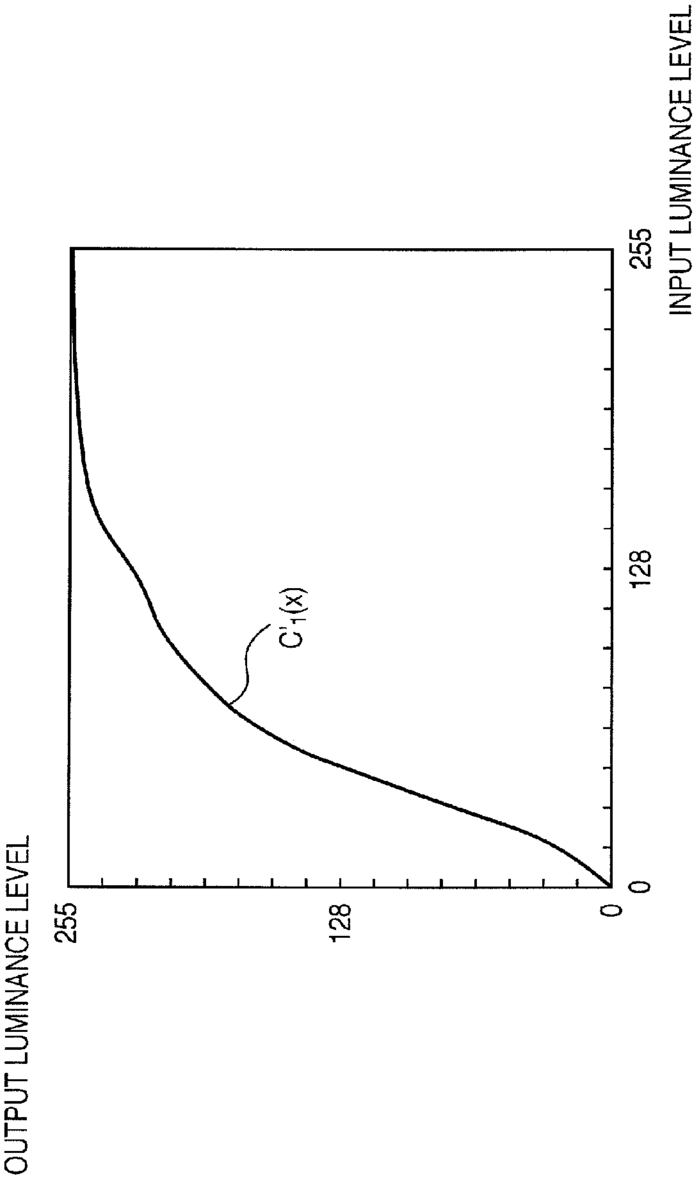
FIG. 15 shows a specific example of a process of combining histogram flattening functions according to the second embodiment.
Figure 16:
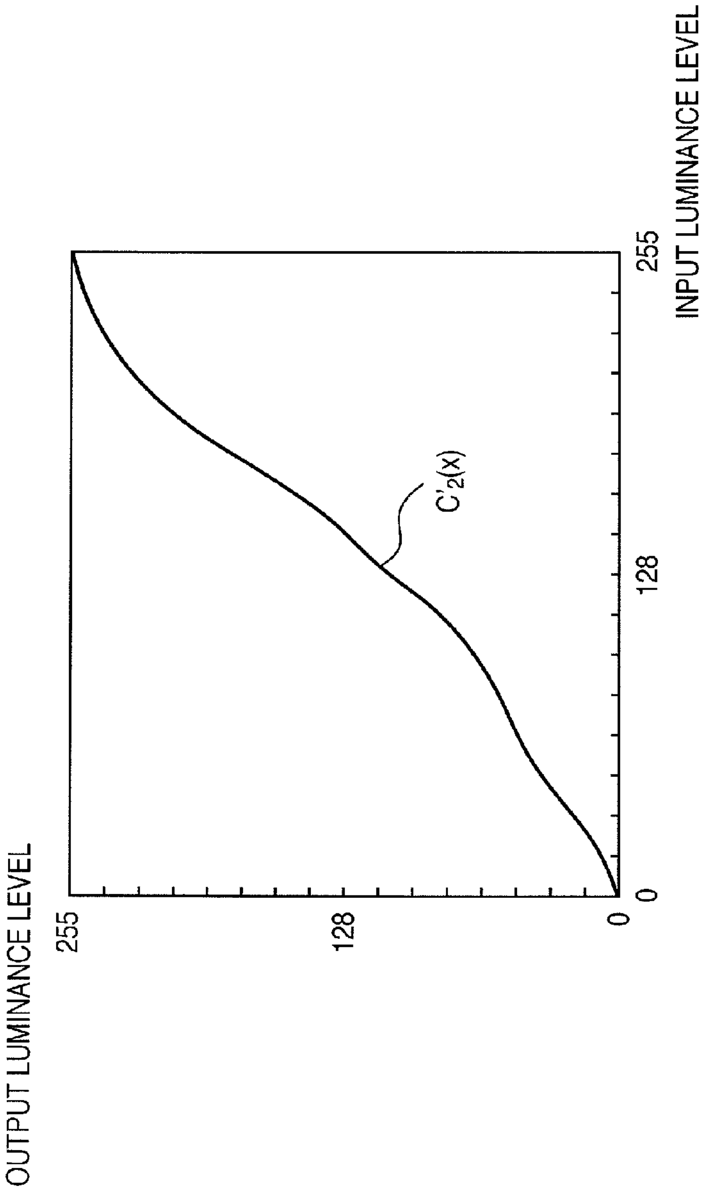
FIG. 16 shows a specific example of a process of combining histogram flattening functions according to the second embodiment.
Figure 17:
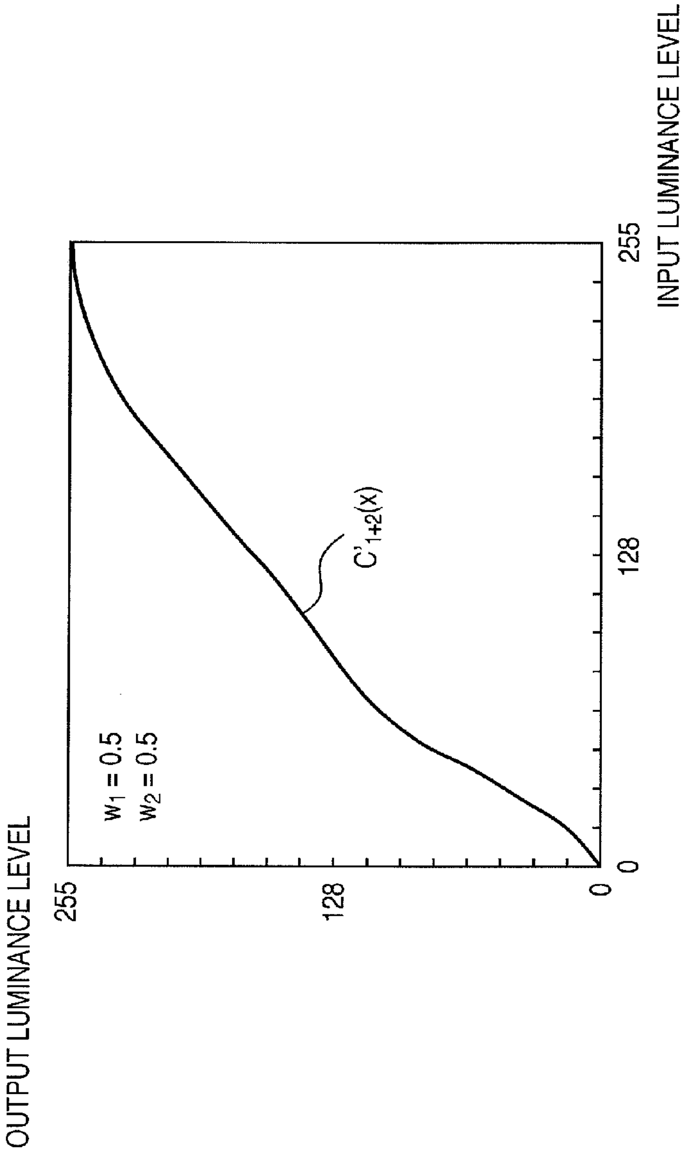
FIG. 17 shows a specific example of a process of combining histogram flattening functions according to the second embodiment.
Figure 18:
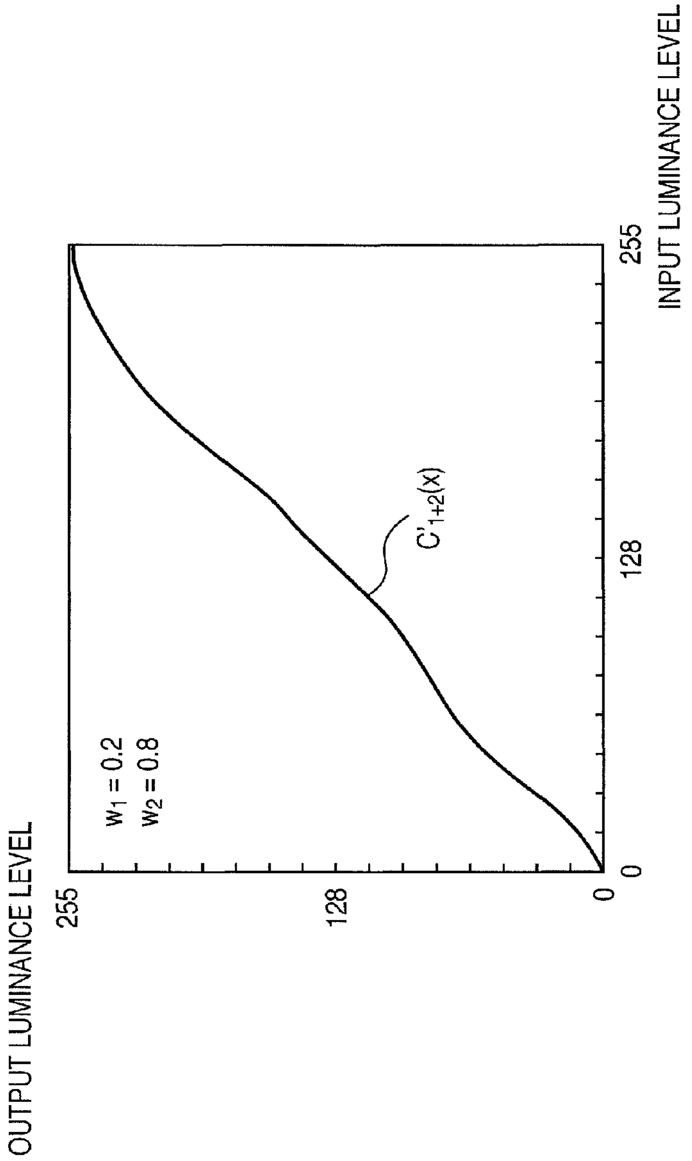
FIG. 18 shows a specific example of a process of combining histogram flattening functions according to the second embodiment.

FIGS. 15 to 18 show specific examples of a process of combining histogram flattening functions according to the second embodiment. In these diagrams, the horizontal axis indicates the input luminance level and the vertical axis indicates an output luminance level. Here, a result of combining the histogram flattening functions shown in FIG. 15 and FIG. 16 using $w_1$=0.5 and $w_2$=0.5 is shown in FIG. 17. Also, a result of combining using $w_1$=0.2 and $w_2$=0.8 is shown in FIG. 18.

The histogram flattening functions shown in FIG. 15 and FIG. 16 have their vertical axes normalized to the output luminance level, and therefore applying a weighted coefficient to meet $w_1+w_2=1$ is sufficient as shown in formula (10).

A limiting process is carried out on the combination result shown in FIG. 17 and FIG. 18 based on formula (11) and the conversion function F(x) is calculated.

$$F(x)=x+0.4(C'_{1+2}(x)-x) \tag{11}$$

Incidentally, the limiting process of the above-mentioned (11) is not limited to being applied only to the combination result shown in FIG. 17 and FIG. 18, and can also be applied to any of the histogram flattening functions shown in FIG. 15 or FIG. 16. In this case, it is possible to increase the proportion of the difference value with respect to the histogram flattening function shown in FIG. 15 for example, and moreover to decrease the proportion of the difference value with respect to the histogram flattening function shown in FIG. 16.

With the second embodiment, normalized functions are combined together and therefore, compared to a case of combining luminance histograms together such as in the first embodiment, there is an advantage of there being only a small amount of data required to be handled. Furthermore, conversion characteristics preferred for each region can be calculated.

[Third Embodiment]

Next, detailed description is given concerning a third embodiment of the present invention with reference to the accompanying drawings. In the third embodiment, the value of the weighted coefficients and the image region size and moreover the proportion of the difference value in the limiting process are changed in response to position information of the target pixel.

Figure 19:
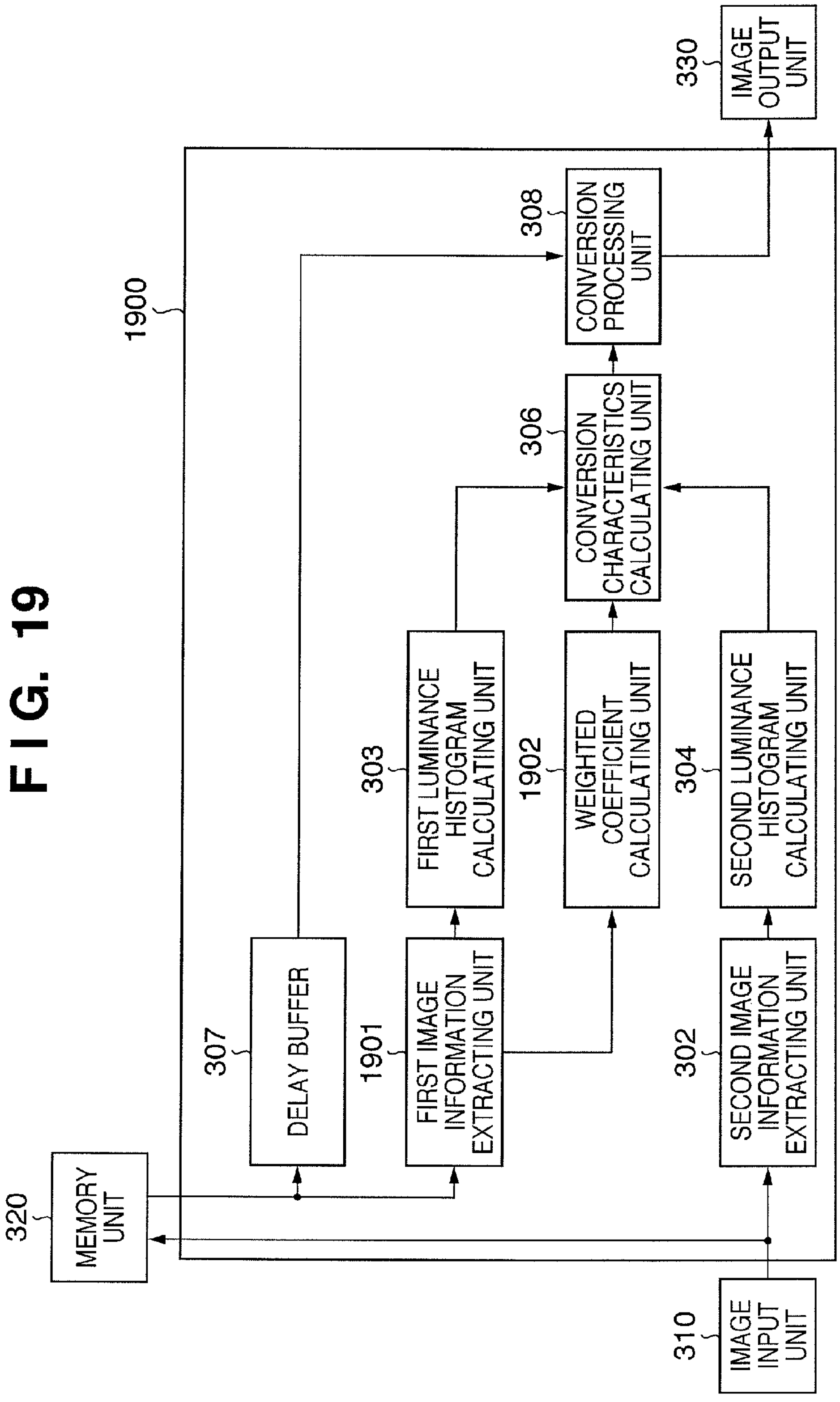
FIG. 19 shows one example of a configuration of a display device according to a third embodiment.

FIG. 19 shows one example of a configuration of a display device according to the third embodiment. Components having a same function as in the first embodiment shown in FIG. 3 are given same symbols and description thereof is omitted. In FIG. 19, numeral 1901 indicates a first image information extracting unit, which receives video signals outputted from the memory unit 320 and determines a position of the target pixel, then sends position information, which indicates what position the target pixel is within the screen, to a weighted coefficient calculating unit 1902. The weighted coefficient calculating unit 1902 selects weighted coefficients prepared in advance based on position information of the target pixel and outputs these to the conversion characteristics calculating unit 306.

Figure 20:
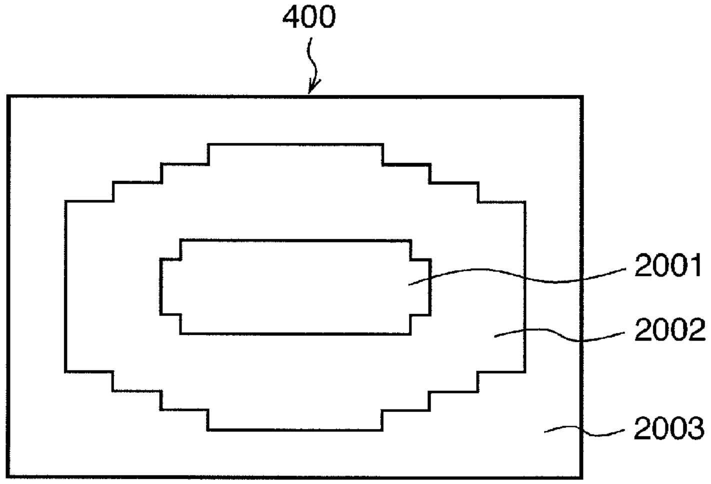
FIG. 20 shows a specific example of a weighted coefficient calculating technique according to the third embodiment.

FIG. 20 shows a specific example of a weighted coefficient calculating technique according to the third embodiment. In this example, the region 400 of the entire screen is shown in a condition in which it is divided into three areas, namely areas 2001, 2002, and 2003. Here, a weighted coefficient is set in the weighted coefficient calculating unit 1902 for each area and, after a determination is made as to which of the three areas the target pixel belong to, the weighted coefficient of the area to which they belong is selected and outputted.

Generally in videos, the content being expressed tends to be positioned in the vicinity of the center of the screen and the gaze of viewers is commonly directed towards the center of the screen. As such, by carrying out tone correction with greater emphasis on areas in the vicinity of the center of the screen and setting the emphasis to be reduced in extent toward peripheral areas of the screen, it is possible to achieve luminance value adjustments giving consideration to the tendency of videos and the gaze of viewers.

Also, the size of the first image region is set for each area in the first image information extracting unit 1901. That is, the size of the first image region can be changed in response to position information of the target pixel. For example, when a Full HD (1,920×1,080 pixels) display device is used, the first image region size in the area 2001 is set to 4×4 pixels, and set to 16×16 pixels in the area 2002, while being set to 32×32 pixels in the area 2003. With these settings, luminance value adjustments can be achieved in which areas of the vicinity of the center of the screen are more emphasized.

Furthermore, the proportion of the difference value in the limiting process of the conversion characteristics calculating unit 306 (the coefficient in the second section on the right in formula (5)) is similarly changed for each position of the target pixel.

With the third embodiment, as described above, by adjusting the value of the weighted coefficients and the image region size and moreover the proportion of the difference value in the limiting process for each position of the target pixel, it is possible to achieve luminance value adjustments giving consideration to positions within the screen. For example, it is possible to achieve luminance value adjustments giving consideration to the tendency for content being mainly expressed in the video to be positioned in the vicinity of the center of the screen as well as the gaze of viewers.

[Fourth Embodiment]

Next, detailed description is given concerning a fourth embodiment of the present invention with reference to the accompanying drawings. In the fourth embodiment, the value of the weighted coefficients and the proportion of the difference value in the limiting process are changed based on a shape of the first luminance histogram and the second luminance histogram.

Figure 21:
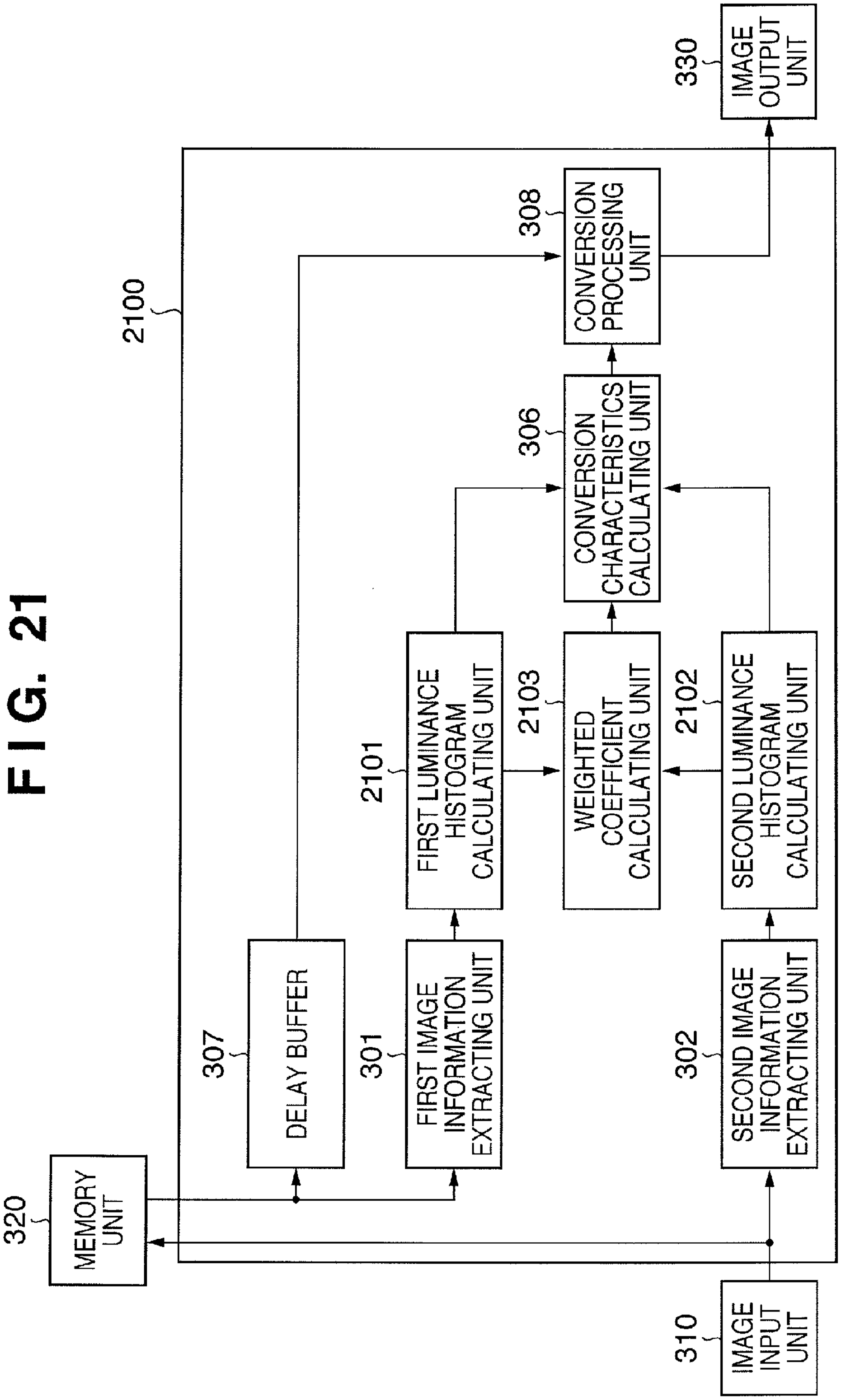
FIG. 21 shows one example of a configuration of a display device according to a fourth embodiment.

FIG. 21 shows one example of a configuration of a display device according to a fourth embodiment. Components having a same function as in the first embodiment shown in FIG. 3 are given same symbols and description thereof is omitted. The first luminance histogram and the second luminance histogram calculated by a first luminance histogram calculating unit 2101 and a second luminance histogram calculation unit 2102 shown in FIG. 21 are outputted to a weighted coefficient calculating unit 2103. The weighted coefficient calculating unit 2103 measures distribution shapes of the inputted first luminance histogram and the second luminance histogram.

Here, measuring distribution shapes refers to performing calculations based on the luminance histograms in regard to such factors as an average luminance value, largest and smallest luminance values, and a largest and smallest number of pixels in each luminance level for example. A weighted coefficient is set in the weighted coefficient calculating unit 2103 for each measurement result of distribution shapes and the weighted coefficient is selected and outputted based on the measurement result.

Furthermore, the proportion of the difference value in the limiting process of the conversion characteristics calculating unit 306 (the coefficient in the second section on the right in formula (5)) is similarly changed depending on the distribution shape of the luminance histogram.

Further still, in addition to the distribution shape of the luminance histogram, it is also possible to extract color information such as memory colors of skin and sky colors and the like from image information of partial areas and use this in adjustments of conversion characteristics.

With the fourth embodiment, by adjusting the value of the weighted coefficients based on the distribution shape and color information of the luminance histograms as well as the proportion of the difference value in the limiting process, it is possible to achieve luminance value adjustments giving consideration to luminance information and color information for each video pattern.

[Fifth Embodiment]

Next, detailed description is given concerning a fifth embodiment of the present invention with reference to the accompanying drawings. In the fifth embodiment, conversion characteristics of a current frame are calculated in response to conversion characteristics of a further preceding single frame.

Figure 22:
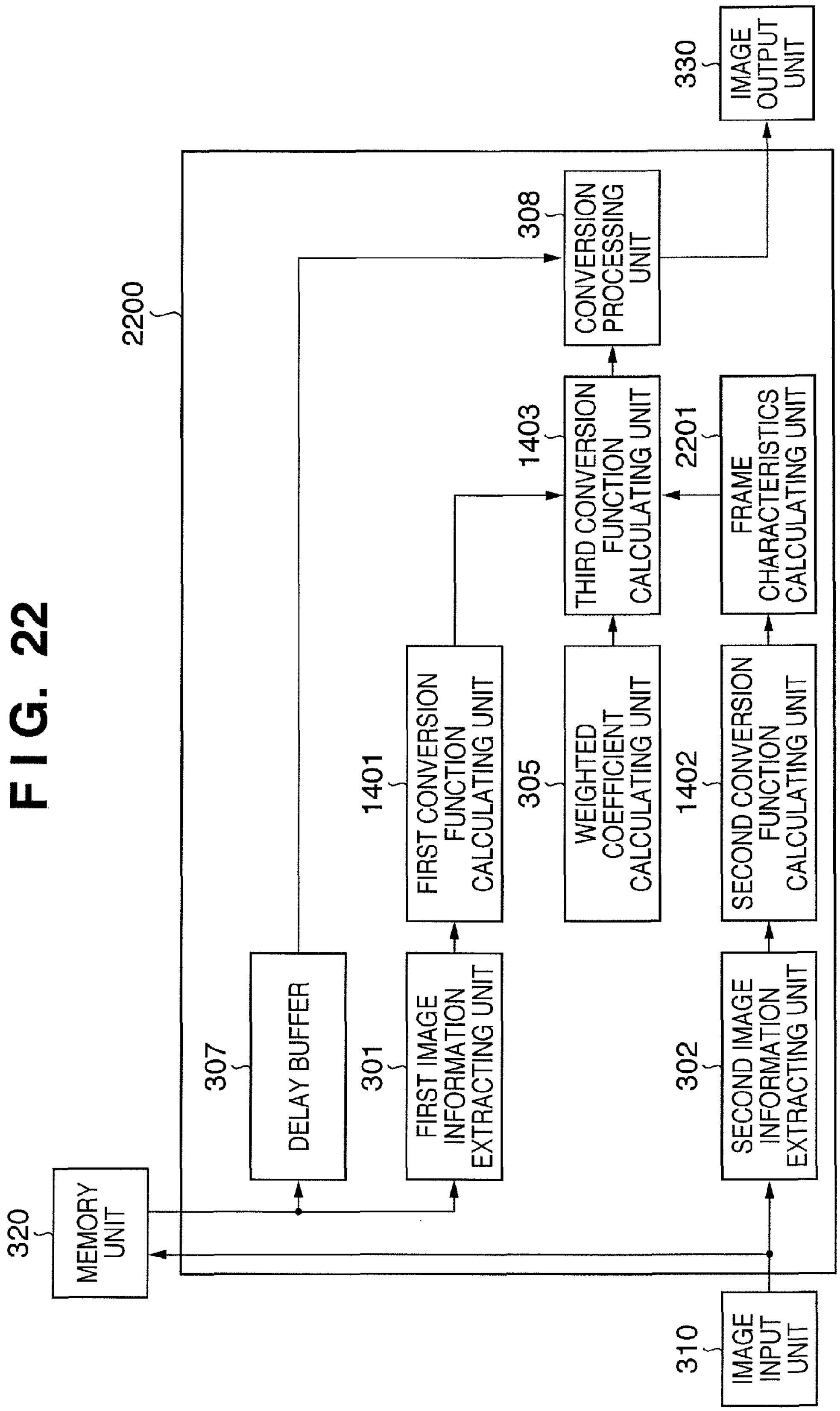
FIG. 22 shows one example of a configuration of a display device according to a fifth embodiment.

FIG. 22 shows one example of a configuration of a display device according to a fifth embodiment. Components having a same function as in the second embodiment shown in FIG. 14 are given same symbols and description thereof is omitted. In FIG. 22, numeral 2201 indicates a frame characteristics calculating unit. The frame characteristics calculating unit 2201 stores a second conversion function of a preceding single frame.

When carrying out luminance value adjustments for continuous video signals such as for moving pictures, screen flickering and the like may be caused when a large difference occurs in the correction amounts between frames.

In the fifth embodiment, in order to reduce this phenomenon, the frame characteristics calculating unit 2201 performs control so that no large difference is created in the correction amounts between the second conversion function of a preceding single frame and the second conversion function of a current frame. That is, the frame characteristics calculating unit 2201 carries out processing so that while the conversion characteristics of the current frame are maintained as much as possible, they are kept close to a constant proportion to the conversion characteristics of the preceding single frame.

Specifically, a difference value between a second histogram flattening function of the preceding single frame and a second histogram flattening function of the current frame is obtained, and 60% of the difference value is added to the second histogram flattening function of the preceding single frame to calculate a new conversion function. A formula for calculation is shown in formula (12). Here, the second histogram flattening function of the preceding single frame is given as $C'_{2old}(x)$ and the second histogram flattening function of the current frame is given as $C'_{2new}(x)$.

$$C'2(x)=C'_{2old}(x)+0.6(C'_{2new}(x)-C'_{2old}(x) \quad (12)$$

The newly obtained second conversion function is outputted to the third conversion function calculating unit 1403 and in the third conversion function calculating unit 1403 a process of combining this with the first conversion function is carried out as described in the second embodiment.

With the above-described process, adjustments are performed so that no large difference is created in correction amounts between frames, which makes it possible to reduce screen flickering.

On the other hand, if the above-described process is carried out when there is a scene change in the inputted video, then video signals requiring a rapid change are made to change gently, which may give the viewer a sense of unnaturalness. Here, scene change refers to images changing in a large area region of the screen, which typically includes switching between scenes or panning screens.

To order to reduce problems relating to such scene changes, the frame characteristics calculating unit 2201 applies the above formula (12) only when a scene change is not detected.

As a technique for detecting a scene change, a scene change may be determined when a difference value between the conversion characteristics of the current frame and the conversion characteristics of the preceding single frame has exceeded a specified numerical value (a threshold value) for example.

Specifically, an absolute value of a difference in the second section on the right in formula (12) is given as the difference value and the threshold value is set with respect to this difference value.

With the fifth embodiment, screen flickering resulting from large differences in correction amounts between frames can be reduced. Moreover, slow changing of video signals at times of scene changes can be reduced, which enables any sense of unnaturalness in the viewer to be made lighter.

It should be noted that in the above-described example, a comparison was carried out between the current frame and the preceding single frame using the histogram flattening functions, but it is also possible to carry out comparisons between frames using the luminance histograms.

Furthermore, in the foregoing embodiments, there is no limitation to the second section on the right in formula (5), formula (11), and formula (12) being coefficients 0.4 and 0.6, and these may be any number. Additionally, various modifications may be carried out without departing from the purport of the present invention.

Furthermore, a system or a device may be provided with a recording medium on which is recorded program code of software for achieving a function of the embodiments, and a computer (CPU or MPU) of this system or device may read out and execute the program code stored on the recording medium. It is evident that an object of the present invention may be achieved in this manner.

In this case, the actual program code that is read out from the recording medium achieves the functionality of the above-described embodiments, such that the recording medium on which the program code is stored constitutes the present invention.

Furthermore, it is evident that the functionality of the foregoing embodiments may be achieved not only by executing program code read out by a computer, but also includes the following cases. Namely, this includes a case of having an OS (operating system) or the like that runs on a computer carry out a part or all of the actual processing according to instructions of the program code such that the functionality of the foregoing embodiments is achieved by the processing thereof.

Further still, it is possible for the program code read out from the recording medium to be written onto a memory provided in an extension board inserted into the computer or an extension unit connected to the computer. It is evident that this may subsequently also include having a CPU or the like provided in the extension board or extension unit carry out a part or all of the actual processing according to instructions of the program code such that the functionality of the foregoing embodiments is achieved by the processing thereof.

Furthermore, the program may enable the functionality of the foregoing embodiments to be executed by a computer, and the form of the program may include forms such as object code, a program executed by an interpreter, or script data or the like provided in an OS.

Recording media for providing the program include a RAM, an NV-RAM, a floppy (registered trademark) disk, an optical disk, a magneto-optical disk, a CD-ROM, an MO, a CD-R, and a CD-RW for example. Further still, any medium that can store the above-described program may be used, including DVDs (DVD-ROM, DVD-RAM, DVD-RW, and DVD+RW), magnetic tape, a nonvolatile memory card, and a ROM or the like. Alternatively, the program can be supplied by being downloaded from a not shown other computer or database or the like connected to the Internet, a business network, or a local area network or the like.

As described above, a display device of the present invention enables adjustment of an image's luminance values while reducing clipped shadows and clipped highlights that occur in some areas when contrast has been emphasized within a limited dynamic range.

The present invention was described using preferred embodiments, but the present invention is not limited to the foregoing embodiments and various modifications are possible within the scope of the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of

Japanese Patent Application No. 2006-117187, filed Apr. 20, 2006, which is hereby incorporated by reference herein in its entirety.

What is claimed is:

1. An apparatus, comprising a processor, in which luminance values of an input image are converted for output, comprising:

a first extracting unit configured to extract first image information from a first region including a target pixel;

a first calculating unit configured to calculate a first conversion characteristic from the first image information;

a second extracting unit configured to extract second image information from a second region including the first region;

a second calculating unit configured to calculate a second conversion characteristic from the second image information;

a weighted coefficient calculating unit configured to calculate a weighted coefficient based on position information of the target pixel;

a frame characteristic calculation unit configured to calculate a value so that the value is kept close to a constant proportion to conversion characteristics of a preceding single frame, the value being a difference value between the second conversion characteristic of the preceding single frame and the second conversion characteristic of a current frame; and a third calculating unit configured to calculate a third conversion characteristic for converting a luminance value of the target pixel, using the first conversion characteristic, the second conversion characteristic, and the weighted coefficient, wherein the luminance value of the target pixel is converted and outputted based on the third conversion characteristic.

2. The apparatus according to claim 1, further comprising a storage unit configured to store image information of the input image, wherein the first calculating unit reads out image information stored in the storage unit as the first image information and successively calculates the first conversion characteristic.

3. The apparatus according to claim 1, wherein the first calculating unit calculates a first luminance histogram of the first image information and the second calculating unit calculates a second luminance histogram of the second image information.

4. The apparatus according to claim 1, wherein the first calculating unit calculates the first conversion characteristic based on a luminance histogram of the first image information and the second calculating unit calculates the second conversion characteristic based on a luminance histogram of the second image information.

5. The apparatus according to claim 3, wherein the weighted coefficient is set in response to at least the first luminance histogram and the second luminance histogram.

6. The apparatus according to claim 1, wherein the weighted coefficient is calculated based on a size of the first region and a size of the second region.

7. The apparatus according to claim 1, wherein a size of the first and second regions is set in response to position information of the target pixel.

8. The apparatus according to claim 1, wherein the third conversion characteristic is calculated in response to at least the second conversion characteristic of the preceding single frame and the second conversion characteristic of the current frame.

9. A method in which luminance values of an input image are converted for output, the method comprising:

extracting first image information from a first region including a target pixel;

calculating a first conversion characteristic from the first image information;

extracting second image information from a second region including the first region;

calculating a second conversion characteristic from the second image information;

calculating a weighted coefficient based on position information of the target pixel;

calculating a value so that the value is kept close to a constant proportion to conversion characteristics of a preceding single frame, the value being a difference value between the second conversion characteristic of the preceding single frame and the second conversion characteristic of a current frame; and calculating a third conversion characteristic for converting a luminance value of the target pixel, using the first conversion characteristic, the second conversion characteristic, and the weighted coefficient, wherein the luminance value of the target pixel is converted and outputted based on the third conversion characteristic.

10. The method according to claim 9, wherein the weighted coefficient is calculated based on a size of the first region and a size of the second region.

11. A non-transitory computer-readable medium storing instructions which, when executed by a processor, causes an apparatus to perform operations comprising:

extracting first image information from a first region including a target pixel;

calculating a first conversion characteristic from the first image information;

extracting second image information from a second region including the first region;

calculating a second conversion characteristic from the second image information;

calculating a weighted coefficient based on position information of the target pixel;

calculating a value so that the value is kept close to a constant proportion to conversion characteristics of a preceding single frame, the value being a difference value between the second conversion characteristic of the preceding single frame and the second conversion characteristic of a current frame; and calculating a third conversion characteristic for converting a luminance value of the target pixel, using the first conversion characteristic, the second conversion characteristic, and the weighted coefficient, wherein the luminance value of the target pixel is converted and outputted based on the third conversion characteristic.

12. The method according to claim 9, further comprising:

storing image information of the input image; and wherein calculating the first conversion characteristic includes:

reading out image information as the first image information; and successively calculating the first conversion characteristic.

13. The method according to claim 9, wherein calculating the first conversion characteristic is based on a luminance histogram of the first image information and calculating the second conversion characteristic is based on a luminance histogram of the second image information.

14. The method according to claim 9, wherein the weighted coefficient is calculated based on a size of the first region and a size of the second region and wherein each size of the first and second regions is set in response to position information of the target pixel.

15. The non-transitory computer-readable medium according to claim 11, further comprising:

storing image information of an input image; and wherein calculating the first conversion characteristic includes:

reading out image information as the first image information; and successively calculating the first conversion characteristic.

16. The non-transitory computer-readable medium according to claim 11, wherein calculating the first conversion characteristic is based on a luminance histogram of the first image information and calculating the second conversion characteristic is based on a luminance histogram of the second image information.

17. The non-transitory computer-readable medium according to claim 11, wherein the weighted coefficient is calculated based on a size of the first region and a size of the second region and wherein each size of the first and second regions is set in response to position information of the target pixel.

* * * * *